United States Patent
Grabbe et al.

[11] Patent Number: 6,077,474
[45] Date of Patent: Jun. 20, 2000

[54] BALL FORMATION APPARATUS

[75] Inventors: Dimitry Grabbe, Middletown; Iosif Korsunksy, Harrisburg, both of Pa.

[73] Assignee: The Whitaker Corporation, Wilmington, Del.

[21] Appl. No.: 08/863,650

[22] Filed: May 27, 1997

Related U.S. Application Data

[60] Provisional application No. 60/018,723, May 31, 1996.

[51] Int. Cl.$^7$ ..................................................... C22B 4/08
[52] U.S. Cl. ........................ 266/237; 164/507; 164/513; 164/147.1
[58] Field of Search .................................. 75/10.14, 345, 75/347; 266/237; 264/10; 164/493, 471, 513, 507, 498, 147.1

[56] References Cited

U.S. PATENT DOCUMENTS

| | | | |
|---|---|---|---|
| 665,905 | 1/1901 | Hill . | |
| 2,313,876 | 3/1943 | Jelinek | 29/148.4 |
| 2,614,317 | 10/1952 | Deussen | 29/148.4 |
| 2,686,864 | 8/1954 | Wroughton et al. | 219/1 |
| 2,758,360 | 8/1956 | Shetler | 29/122 |
| 2,919,471 | 1/1960 | Hechiger | 18/47.2 |
| 2,952,868 | 9/1960 | Rowan | 18/1 |
| 2,980,628 | 4/1961 | Smith | 252/359 |
| 3,023,171 | 2/1962 | Smith | 252/359 |
| 3,183,537 | 5/1965 | Storr | 18/2.7 |
| 3,270,398 | 9/1966 | Stewart | 29/148.4 |
| 3,334,408 | 8/1967 | Ayers | 29/420.5 |
| 3,466,910 | 9/1969 | Carlsen | 72/71 |
| 3,477,267 | 11/1969 | Crumley | 72/185 |
| 3,543,553 | 12/1970 | Marcovitch | 72/91 |
| 4,003,232 | 1/1977 | Trendov | 29/148.4 |
| 4,553,917 | 11/1985 | Lee | 264/5 |
| 4,565,571 | 1/1986 | Abbaschian | 75/0.5 C |
| 4,783,217 | 11/1988 | Robertson | 75/0.5 B |
| 5,032,172 | 7/1991 | Overfelt et al. | 75/255 |
| 5,229,016 | 7/1993 | Hayes et al. | 222/590 |

FOREIGN PATENT DOCUMENTS

| | | | |
|---|---|---|---|
| 2198977 | 6/1988 | United Kingdom | B22D 17/30 |

OTHER PUBLICATIONS

Ruel A. (Tony) Overfelt IEEE Transactions on Magnetics. vol. 27, No. 6 Nov. 1991.

Derwent Publication, Abstract of SU 605 685, Week 013 May 10, 1979.

*Primary Examiner*—Melvyn Andrews

[57] ABSTRACT

An apparatus and method of forming balls includes a metering device 2, a melting device 14 and a cooling device 20. The metering device 14 stamps a desired volume of solid material in the form of a slug 12 which passes through the melting device 14 where it is caused to levitate and transform state from a solid to a molten liquid. The molten liquid material 13 is released from the melting device 14 and descends through the cooling device 20 where it transforms state once again from a molten material to a solid material while maintaining a ball shape. A forming gas is passed over the molten material 13 in a direction opposite to the falling molten material 13. The balls 15 are finally cooled in a cooling bath 32.

3 Claims, 5 Drawing Sheets

BALL FORMATION APPARATUS

This application claims benifit of U.S. Provisional Application 60/018,723 May 31, 1996.

FIELD OF THE INVENTION

This invention relates to the field of forming balls and more particularly to the mass production of precisely sized and shaped balls.

BACKGROUND OF THE INVENTION

Precision methods of producing accurately sized and shaped spherical objects or balls have been applied in the art of producing ball bearings for high performance mechanical operations. These manufacturing methods also have application in the electronics packaging art, especially in forming ball grid arrays, which are electronic packages having arrays of balls attached to the bottom of a substrate which contains computer chips or other components. In these applications, very small balls of approximately 0.022" must be applied to the bottom of a substrate in a dense array sometimes containing hundreds of these balls. The balls act as electrical contacts for connecting the ball grid array to a complementary electrical connector or another substrate and must all be exactly the same size and shape so as to achieve coplanarity along the entire mating surface of the ball grid array. In order to achieve a perfectly spherical ball in the manufacturing process, environmental factors such as gravity must be minimized or overcome.

Known methods of producing balls typically involve either screw machining or cold forming metal slugs into spheres. These methods typically repeatedly impinge the slugs onto a hard surface until the balls are spherically formed from the slugs. These known methods are unsatisfactory for precision applications since the ultimate size and shape of the balls are not precisely controllable. Additionally, the cost per ball produced is high, and it is desirable to produce precisely sized and shaped balls for a fraction of a cent each.

U.S. Pat. Nos. 2,980,628 and 3,023,171 to Smith disclose other methods of making spherical articles using a series of dropping tips in oil or gelling bath. While these methods result in substantially spherical objects, the end products are not perfect spheres and sometimes vary in size with respect to each other due to the inaccuracies of the dropping tips. The pressure and temperature of the fluid entering the dropping tips must be precisely controlled in order to achieve consistency in size of the end product balls.

U.S. Pat. No. 4,783,217 discloses a method and apparatus for producing spherical objects where the apparatus has a reservoir filled with a relatively dense molten material. The reservoir is heated and hydraulically pressurized to maintain the state of the dense material, and a second molten liquid of lesser density and higher melting point is injected into the reservoir. The pressure and surface tension in the reservoir acts to force the injected material into a spherical form and since the melting point of the dense molten material is lower than that of the injected molten material, the injected molten material will solidify as it rises through the dense molten material. This method is more precisely controllable due to the fact that an exact amount of molten material can be injected into the bath to repeatedly achieve a precise desired ball size. The problem with this device, however, is that the dense molten material must be maintained in a heated and pressurized state and the injected molten material must also be maintained at precise pressure and temperature conditions. This manufacturing method therefore requires heating of the entire apparatus and robust parts capable of withstanding the high temperatures necessary to maintain both metals in a molten state. It is therefore costly to manufacture the apparatus and also costly to operate it due to the heating and pressurizing requirements. What is needed is a simple apparatus which is relatively inexpensive to assembly and to operate, which is capable of mass producing precise sized and shaped balls.

SUMMARY OF THE INVENTION

It is the object of this invention to provide an apparatus capable of mass producing accurately shaped and precisely sized spherical balls.

The object of this invention was achieved by providing an apparatus having a material metering device, a melting device, and a cooling device. The apparatus is designed to first meter out a precise volume of material which is dropped into the melting device where it will be transformed into a molten liquid state. The molten liquid is then dropped through a cooling tower having gas circulated therethrough to prevent oxides from forming on the molten liquid as it cools. As the molten liquid passes through the cooling tower, a skin is formed on the outer surface as it cools and the precise spherical shape is achieved. The sphere is then dropped into a cooling bath for further cooling and total solidification.

BRIEF DESCRIPTION OF THE DRAWINGS

The invention will now be described by way of example with reference to the attached figures of which.

DETAILED DESCRIPTION OF THE INVENTION

Figure 1:
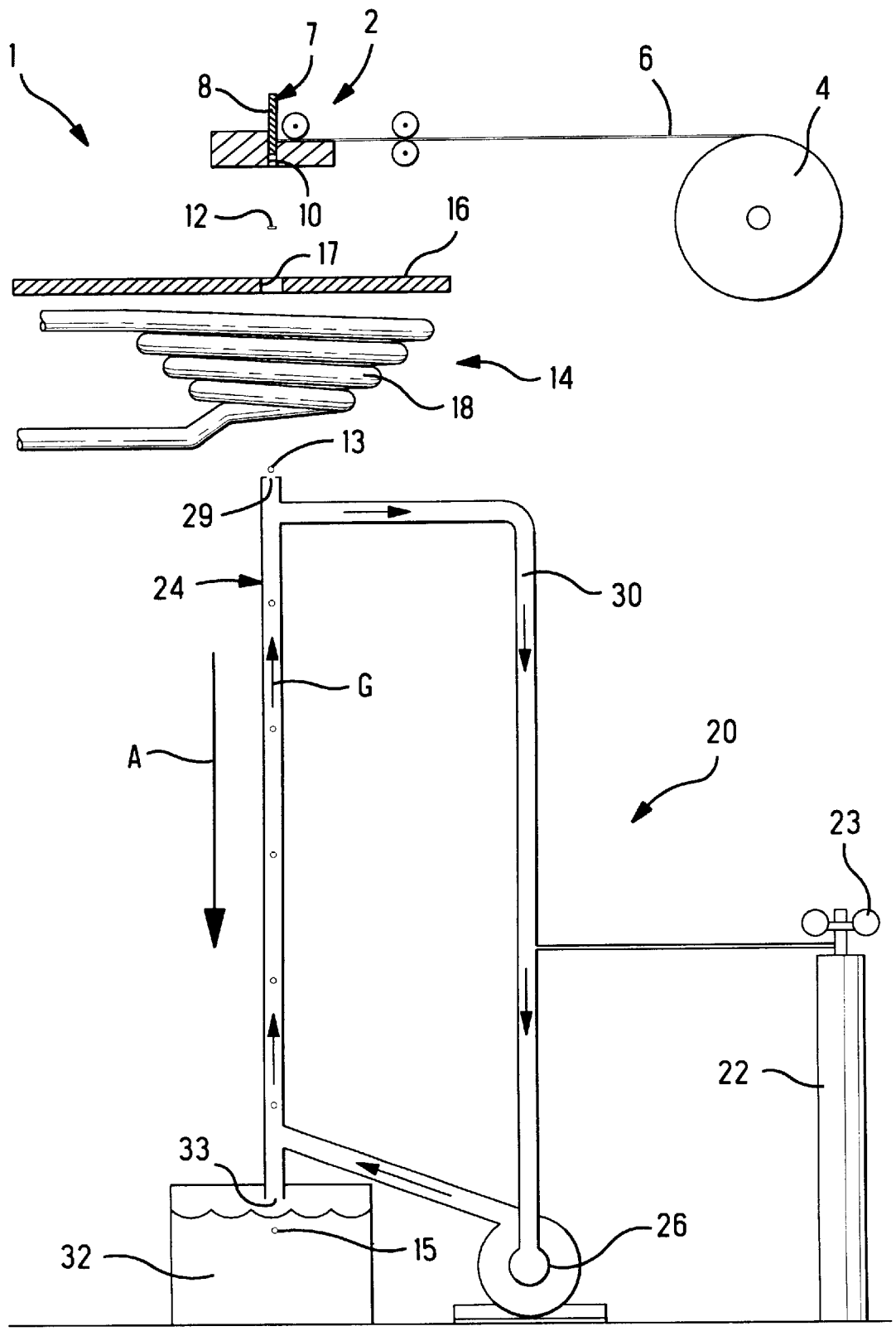
FIG.1 shows a diagrammatic view of the ball forming apparatus.

The ball forming apparatus 1 will be described generally with reference to the diagrammatic view of FIG. 1. The apparatus 1 consists of three major components, a metering device 2, a melting device 14, and the cooling device 20. The metering device 2 precisely meters a desired volume of solid material which will be referred to as a slug 12. This slug 12 is dropped into the melting device 14 where it will change state from solid to molten liquid. The molten liquid will naturally take the form of a sphere 13 as it exits the melting device 14. The molten liquid sphere 13 then is dropped into a cooling device 20 where it is solidified and formed into a solid ball 15.

Each of the major components will now be described in greater detail. Again with reference to FIG. 1, the metering device consists of a spool 4 of solid wire material 6 which may be either flat stock or circular wire of the desired composition for example, steel. The wire 6 is fed into a reciprocating press 7 having a punch 8 and stop wall 10.

The melting device 14 consists of a bucking plate 16 having an opening 17 therein, and a levitation melting coil 18. The levitation melting coil 18 is conically wound from a tubular conductive material such that its top portion is of a greater diameter than its bottom portion. Water or other suitable cooling fluids may be circulated through the tubular material of the levitation melting coil 18.

Finally the cooling device 20 consists of a gas cooling chamber 24 having a forming tower 28 and a gas recirculating arm 30. The forming tower 28 is designed to have an entrance opening 29 at a top end and an exit opening 33 at a bottom end. The entrance opening 29 which is smaller than the diameter of the forming tower 28 is formed in a cap 25 which covers the top of the forming tower 28. A gas recirculating pump 26 is provided in the gas recirculating arm 30 and a forming gas supply 22 is also provided in the gas recirculating arm 30. A cooling bath 32 is provided below the exit opening 33 at the end of the forming tower 28 for final cooling.

Assembly and operation of the ball forming apparatus will now be described in greater detail. Referring again to FIG. 1, the apparatus 1 is assembled as follows:

First, the metering device 2 is arranged at the top of the apparatus 1 such that the metered slug 12 will drop out of the metering device and be aligned to enter the opening 17 in the bucking plate 16 of the melting device 14. The melting device 14 consisting of the bucking plate 16 and the levitation melting coil 18 is placed between the metering device 2 and the cooling device 20. The melting device 14 must be aligned such that the opening 17 will accept a falling slug 12 and also must be aligned with the cooling device 20 such that when the spherical molten material 13 falls from the bottom of the melting device 14, it will enter the entrance opening 29 of the cooling tower 24. The cooling device 20 is placed under the melting device 14 and is aligned such that it will accept the molten spherical material 13 which is dropped from the melting device 14. The cooling device 20 has a forming gas supply 22 having a valve 23 to introduce a desired volume of forming gas into the recirculating arm 30. The recirculating pump 26 is arranged in the recirculating arm 30 of the cooling device 20 such that it pumps the forming gas through the device 20 in a direction opposite that of the falling spherical molten material 13. The spherical molten material 13 falls in a direction indicated by the arrow marked "A" and the forming gas flows in the direction of the arrows marked "G".

Figure 2:
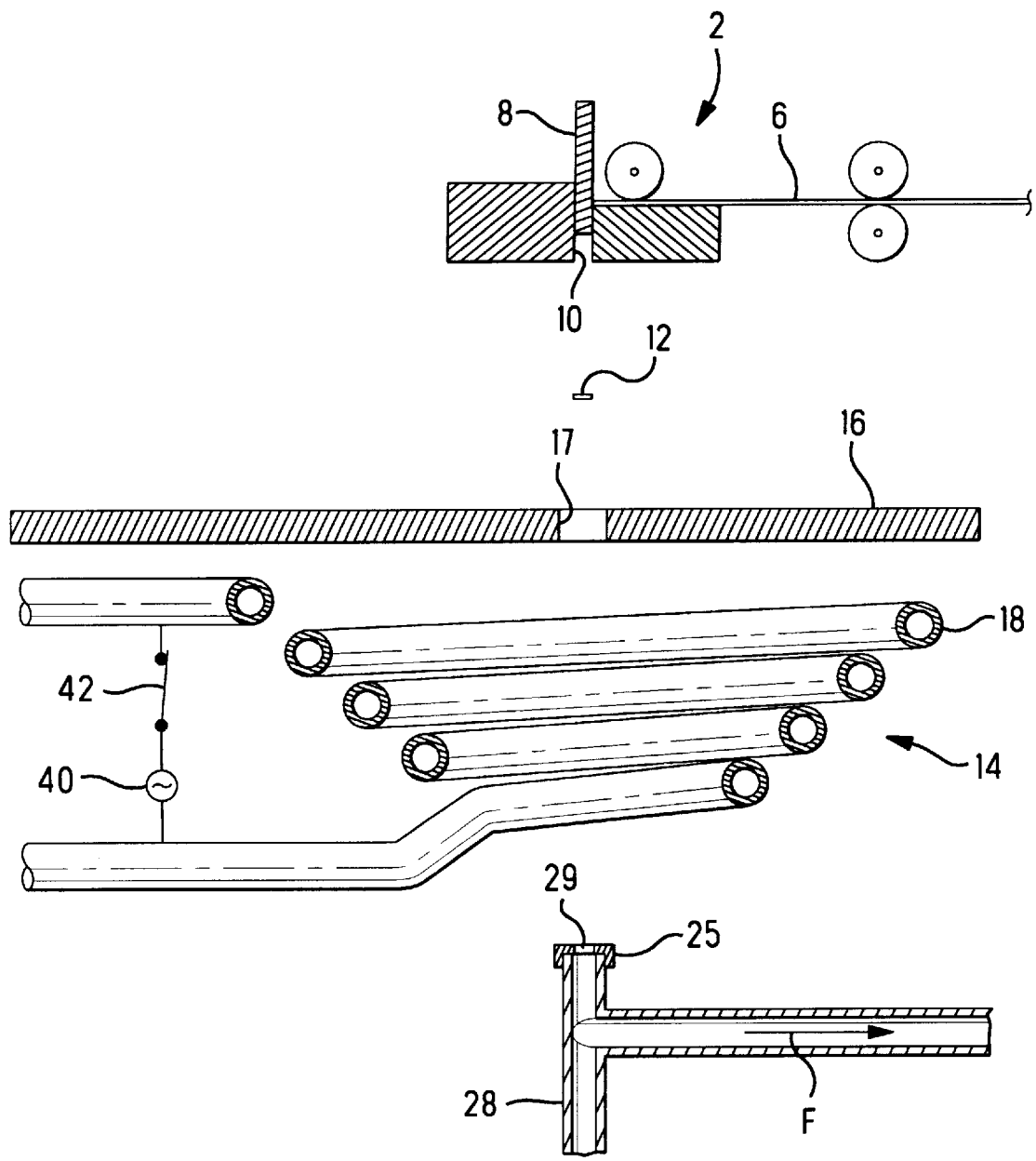
FIG. 2 shows a partial cross sectional view including part of the metering device, the melting device, and part of the cooling device, just after a piece of metal has been metered from the metering device and is about to fall into the melting device.
Figure 3:
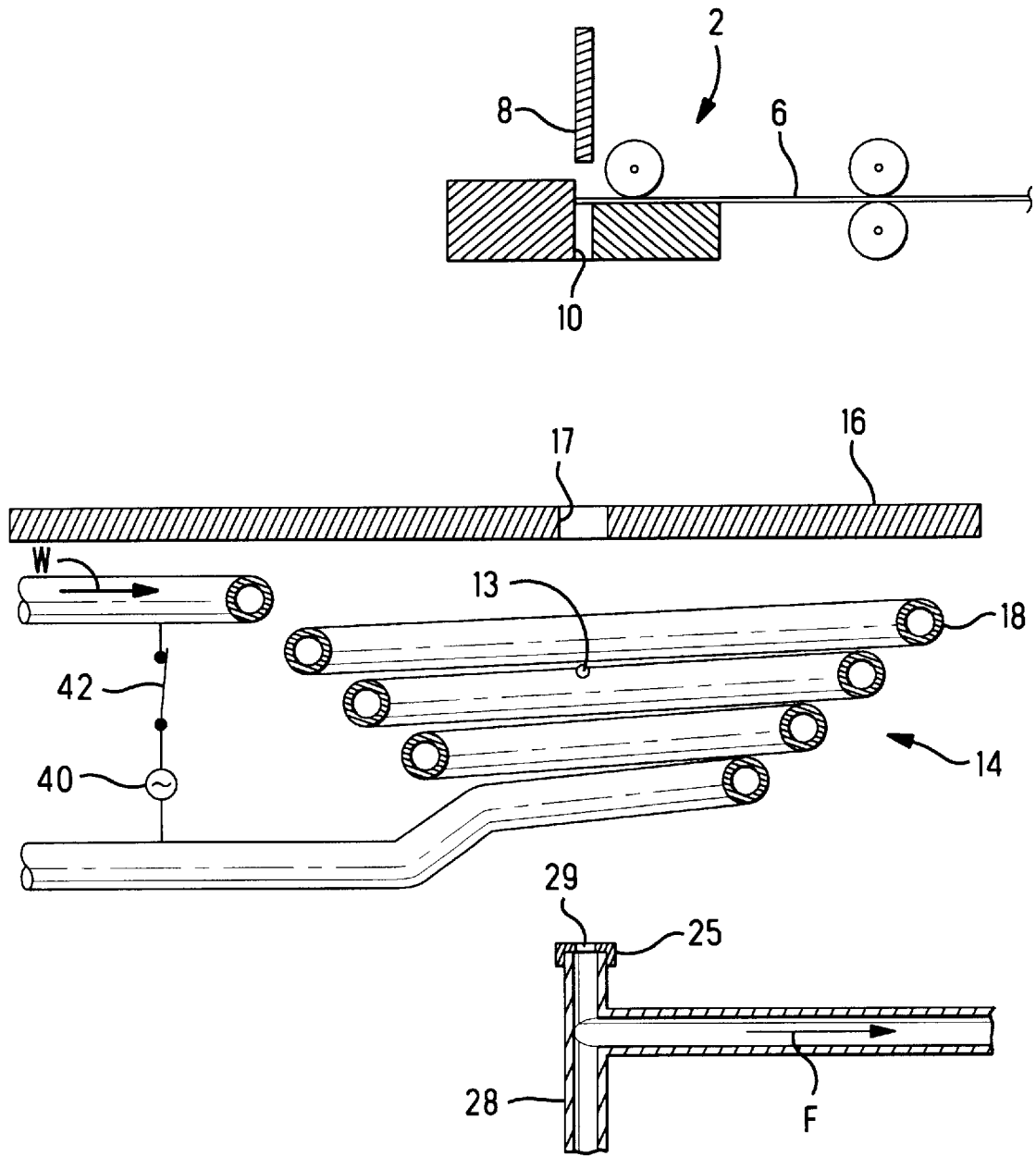
FIG. 3 shows a partial cross sectional view similar to that of FIG. 2 where the slug is being levitated in the melting device and has been converted to a molten state.

The method of forming balls using this apparatus will now be described in greater detail with reference to FIGS. 2–5. Referring first to FIG. 2, a slug 12 is punched from a wire 6 being fed into the metering device 2. The precise volume of the slug is controlled by adjusting either the backing wall 10 or by changing the diameter of the wire 6 that is fed into the punch 8. The slug 12 is shown here as it is falling and just before entering the heating device 14. At this point the levitation melting coil 14 has cooling water circulating through its core and it is energized with a high frequency signal generator 40 through a relay or switch 42. The high frequency signal will perform both the functions of induction heating and levitation of the slug 12. Referring to FIG. 3, the slug has entered the heating device 14 and is in the process of being transformed from a solid into a spherical molten material 13. Note that the material 13 is levitating and the transformation is being accomplished through the high frequency excitation of the levitation melting coil 18.

Figure 4:
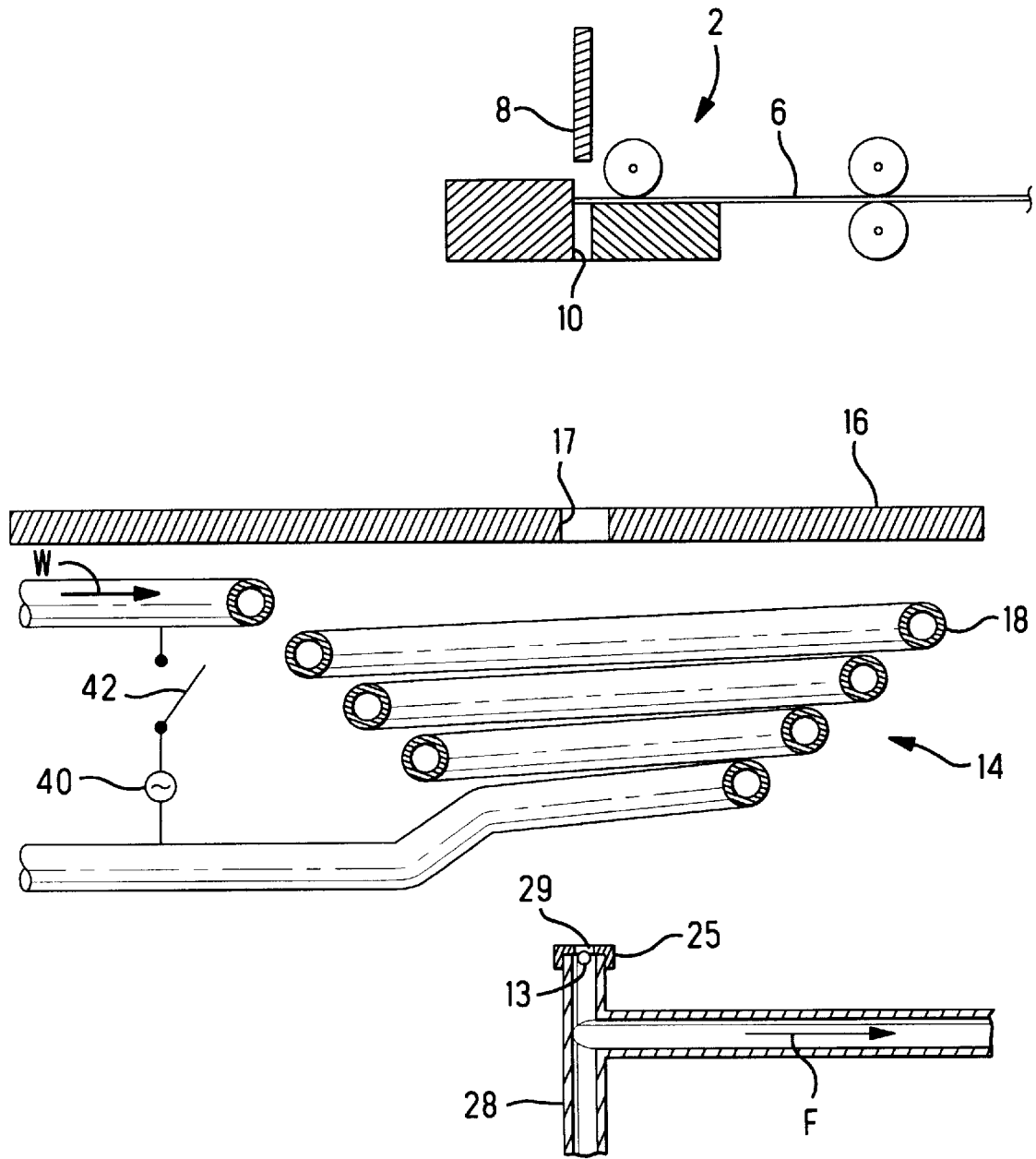
FIG. 4 shows a partial cross sectional view similar to those of FIGS. 2 and 3 where the molten material has been released from the melting device and is entering the cooling device.
Figure 5:
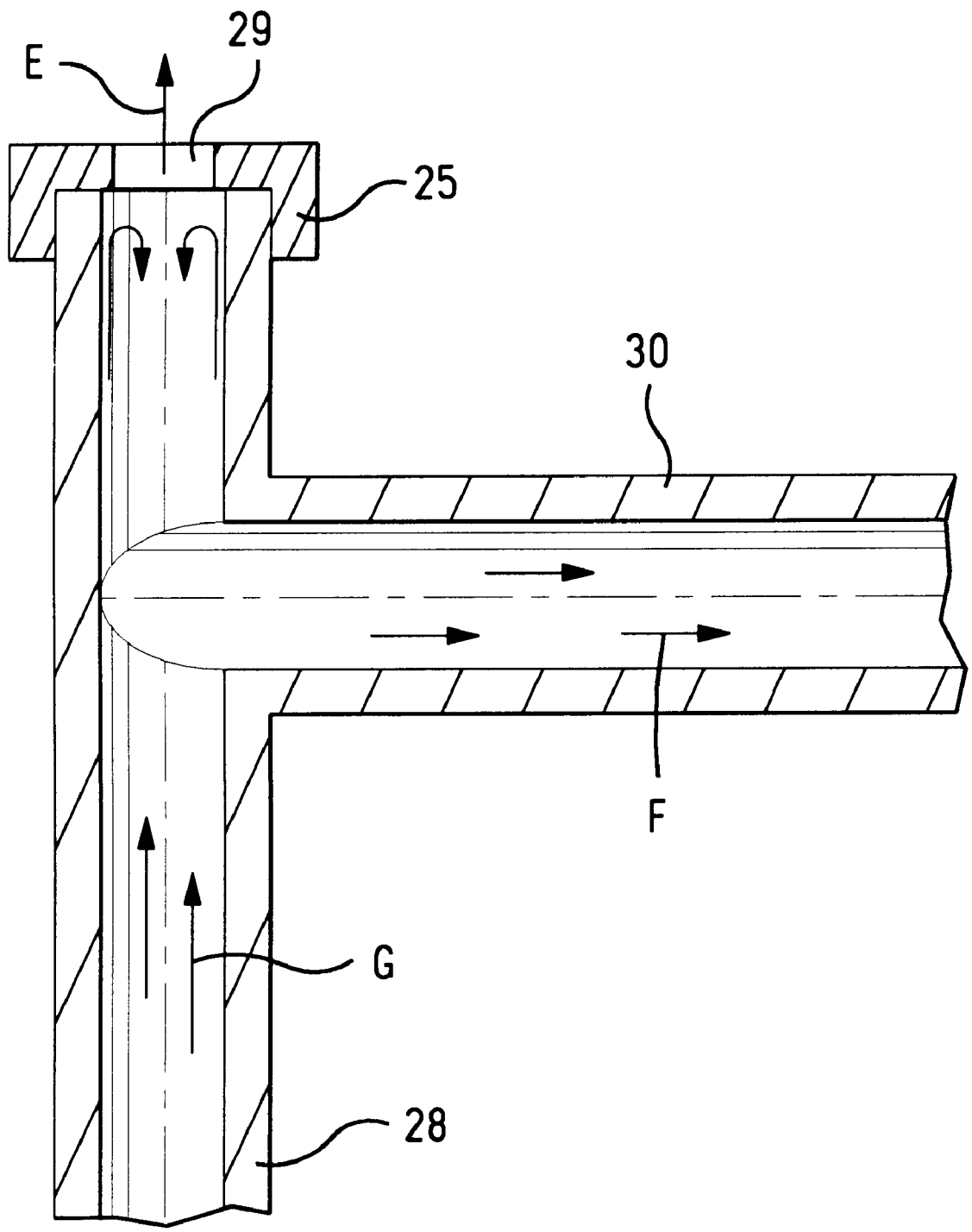
FIG. 5 shows a cross sectional view of the top of the cooling device wherein the gas flow is indicated by the arrows.

Once the solid material has been transformed into a molten liquid material 13, the switch 42 is opened and the levitation coil 18 is deenergized causing the spherical molten material 13 to fall out of the melting device 14 and enter the cooling tower 28 at the entrance opening 29 (FIG. 4). At this point the spherical molten material 13 is spinning as it falls due to the magnetic field that was previously applied to it through high frequency excitation of the levitation melting coil 18. The entrance opening 29 is formed in a cap 25 which substantially covers the top opening of the tower 28 in order to minimize the amount of recirculating gas that escapes the entrance opening 29. This entrance opening 29 is profiled to be slightly larger the diameter of the spherical molten material 13 which is entering the cooling tower 28. As a result, most of the gas will reenter the recirculating arm 30 as indicated by the arrows in FIG. 5. The arrow marked "E" indicates the small amount of gas that will exit the top of the cooling tower 28. Most of the gas, however, will recirculate from the cooling tower 28 into the recirculating arm 30.

Referring once again to FIG. 1, the gas supply 22 contains a gas which will prevent oxides from forming on the spherical molten material 13 as it descends through the cooling tower 28. This gas can be either hydrogen or a hydrogen-nitrogen mixture and is commercially available from several sources. The recirculating pump 26 keeps the gas circulating from the cooling tower 28 into the recirculating arm 30 and back to the cooling tower 28 in a direction indicated by arrows marked "G" opposite that of the falling molten material 13. As the spherical molten material 13 falls through the cooling tower 28, a hard skin forms on its outer surface as it begins to solidify. By the time the spherical molten material 13 reaches the exit opening 33 of the cooling tower 28, it is almost completely solid with perhaps some molten material still in the center-most section of the sphere 13. The formed ball 15 then enters a cooling bath of a suitable cooling liquid 32, for example oil which reduces its temperature further to completely solidify the molten material. It should be noted that this cooling bath does not in any way deform the ball 15; it only completes the cooling process through the cooling fluid 32. The ball 15 may then be removed from the cooling fluid 32 and is ready for final polishing or overplating as may be necessary for the end application.

As the spherical molten material 13 exits the melting device 14, the punch 8 descends to eject another slug 12. The levitation melting coil 18 is re-energized and the entire process is repeated as described. Several balls may therefore be in process simultaneously as represented by the multiple balls appearing in FIG. 1. Using this method of manufacturing a throughput of 10 balls per second can be achieved.

The advantage of this device is that it is relatively inexpensive to assemble and to operate, and also provides balls of the precise desired volume which can be mass produced at a rate of approximately ten balls per second.

While the concepts presented here are shown by way of example using the attached figures, it should be understood that one of ordinary skill in the art would be able to apply these concepts using obvious variations in methods of heating, for example, or metering or cooling which are consistent with the spirit of and within the scope of this invention.

We claim:

1. A ball forming apparatus comprising:
   a metering device which meters a desired volume of solid material and expels the solid material;
   a melting device including a bucking plate having a passage through which the solid material passes, and a levitation melting coil having a conically wound tubular member which is disposed adjacent to the bucking plate such that the bucking plate is positioned parallel to a wide opening of the conically wound tubular member to transform the solid material from a solid state to a molten liquid state and release the molten liquid material therefrom; and
   a cooling device which receives the molten liquid material and transforms the material from a molten liquid state to a solid state while maintaining the material in a spherical shape.

2. A ball forming apparatus as recited in claim 1 wherein the metering device comprises:
   a feed spool for holding the solid material;
   a feeding mechanism for feeding the solid material from the spool; and
   a press for receiving the solid material from the feeding mechanism and for cutting a desired volume of the material from the spool.

3. A ball forming apparatus as recited in claim 1 wherein the cooling device comprises:
   a cooling tower to receive the molten material from the melting device, the cooling tower adapted to have a forming gas circulated therethrough in a direction opposite a direction of the moving molten material.

* * * * *